United States Patent
Wheelwright et al.

(10) Patent No.: US 10,678,048 B1
(45) Date of Patent: Jun. 9, 2020

(54) HEAD MOUNTED DISPLAY WITH TILED OPTICAL ASSEMBLY

(71) Applicant: Facebook Technologies, LLC, Menlo Park, CA (US)

(72) Inventors: Brian Wheelwright, Sammamish, WA (US); Ying Geng, Sammamish, WA (US); Jacques Gollier, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/015,649

(22) Filed: Jun. 22, 2018

(51) Int. Cl.
*G09G 5/00* (2006.01)
*G02B 27/00* (2006.01)

(52) U.S. Cl.
CPC ...... *G02B 27/0081* (2013.01); *G02B 27/0025* (2013.01)

(58) Field of Classification Search
CPC ............... G02B 27/0093; G02B 27/01; G02B 27/0103; G02B 27/017; G02B 27/0172; G02B 27/0179; G02B 27/0189; G02B 2027/0105; G02B 2027/0107; G02B 2027/011; G02B 2027/0114; G02B 2027/0116; G02B 2027/0123; G02B 2027/0125; G02B 2027/0127; G02B 2027/0129; G02B 27/0081; G02B 27/0025; B60K 2370/1529; B60K 2370/31; B60K 2370/1526; B60K 2370/166; B60K 2370/29; B60K 2370/336

See application file for complete search history.

(56) References Cited

U.S. PATENT DOCUMENTS

2016/0240013 A1\* 8/2016 Spitzer ..................... G06F 3/013
2017/0115489 A1\* 4/2017 Hu ....................... G02B 27/0172
2017/0285344 A1\* 10/2017 Benko ................ G02B 27/0172

\* cited by examiner

*Primary Examiner* — Duc Q Dinh
(74) *Attorney, Agent, or Firm* — Fenwick & West LLP

(57) ABSTRACT

A display assembly includes a primary display, a temporal display, and a tiled optical assembly (TOA). The TOA includes a central optic and a peripheral lens assembly. The central optic provides light from the primary display to the user. The peripheral lens assembly is positioned to provide light from the temporal display to the user. The peripheral lens assembly may be a single or multi-lens array. In some embodiments, the temporal display is a lower resolution than the primary display. In some embodiments, the primary display and the temporal display are in the same plane, and a fold mirror is used to provide light from the peripheral display to the peripheral optical element. The display assembly may be incorporated into an artificial reality head-mounted display.

20 Claims, 6 Drawing Sheets

HEAD MOUNTED DISPLAY WITH TILED OPTICAL ASSEMBLY

BACKGROUND

This disclosure relates generally to a head mounted display, and more specifically to a head mounted display with a tiled optical assembly.

In a head-mounted display (HMD), a user's eye occupies a region of space generally referred to as an eye box (typically there is a respective eye box for a left and a right eye of the user). The HMD displays and directs content to the eye boxes. Some HMDs have a split lens architecture, which allows for a greater field of view (FOV). Typically, a greater FOV results in a greater sense of immersion and better situational awareness. Conventional split lens architectures have a first optical element coupled to a second optical element and a first display that provides light to the first optical element and a second display that provides light to the second optical element. The first and second optical elements are typically large, high performance optics, and the first and second displays are typically high resolution displays. A user wearing a HMD will see the light from the second display with peripheral vision. So, conventional split lens architectures are bulky and waste resolution at the large fields.

SUMMARY

A tiled optical assembly (TOA) includes a central optic and a peripheral lens assembly. The central optic transmits light over a first angular range from a first portion of an electronic display assembly to an eyebox. The peripheral lens assembly is coupled along a periphery of the central optic and transmits light over a second angular range from a second portion of the electronic display assembly, wherein the second angular range is different than the first angular range. The first angular range and the second angular range together form a field of view of a head-mounted display.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A display assembly includes a primary display, a temporal display, and a tiled optical assembly (TOA). The TOA includes a central optic and a peripheral lens assembly. The central optic provides light from the primary display to the user. The peripheral lens assembly is positioned to provide light from the temporal display to the user. The peripheral lens assembly may be a single or multi-peripheral lens assembly. In some embodiments, the temporal display is a lower resolution than the primary display. In some embodiments, the primary display and the temporal display are in the same plane, and a fold mirror is used to provide light from the temporal display to the peripheral lens assembly. The display assembly may be incorporated into an artificial reality head-mounted display.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

System Architecture

Figure 1:
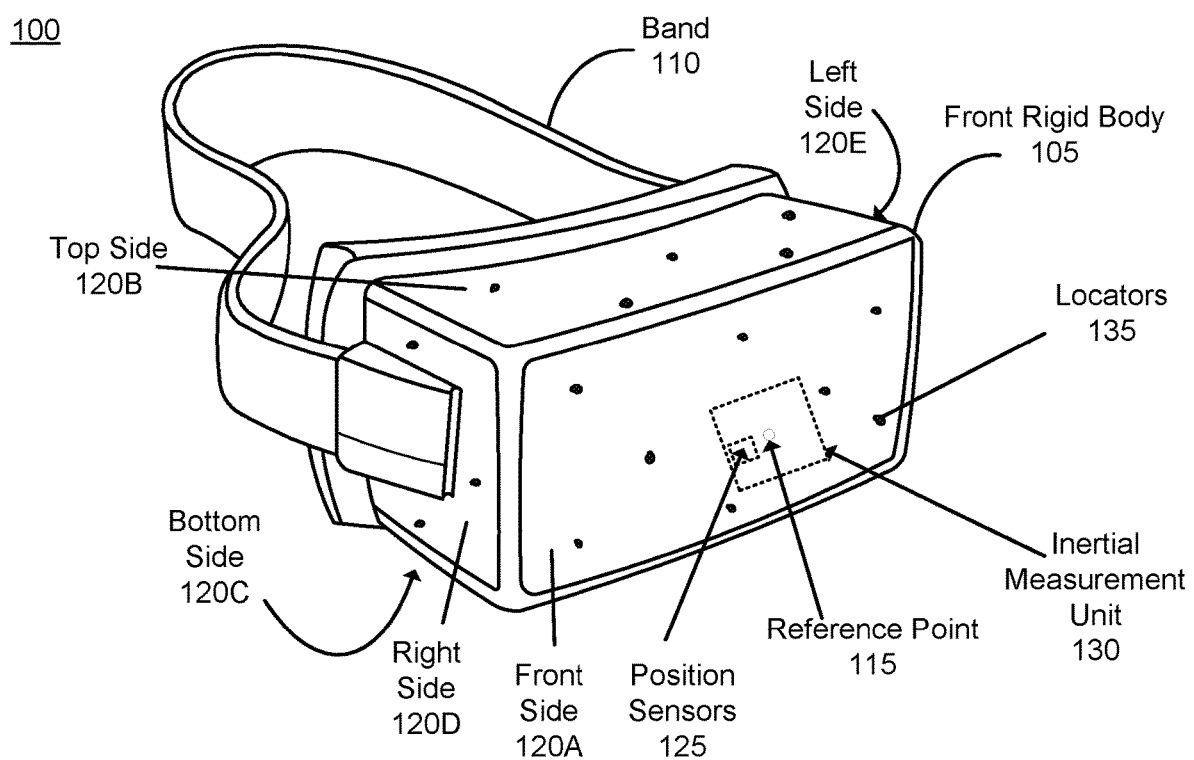
FIG. 1 is a diagram of a head-mounted display (HMD), in accordance with one or more embodiments.

FIG. 1 is a diagram of an HMD 100, in accordance with one or more embodiments. The HMD 100 may be a part of an artificial reality system. The HMD 100 includes a front rigid body 105 having a front side 120A, top side 120B, bottom side 120C, right side 120D, and left side 120E, and a band 110. In some embodiments portions of a front side 120A of the HMD 100 are at least partially transparent in the visible band (~380 nm to 750 nm), and portions of the HMD 100 that are between the front side 120A of the HMD 100 and an eye of the user are at least partially transparent (e.g., a partially transparent electronic display).

The front rigid body 105 includes one or more electronic displays (not shown in FIG. 1), an inertial measurement unit (IMU) 130, one or more position sensors 125, and one or more locators 135. In the embodiment shown by FIG. 1, the position sensors 125 are located within the IMU 130, and neither the IMU 130 nor the position sensors 125 are visible to the user.

The locators 135 may be located in fixed positions on the front rigid body 105 relative to one another and relative to a reference point 115. In the example of FIG. 1, the reference point 115 is located at the center of the IMU 130. Each of the locators 135 may emit light that is detectable by an imaging device (e.g., an imaging device 610 illustrated in FIG. 6, described in greater detail below). In some embodiments, the locators 135 may comprise passive elements (e.g., a retroreflector) configured to reflect light from a light source that may be detectable by an imaging device. Locators 135, or portions of locators 135, are located on the front side 120A, the top side 120B, the bottom side 120C, the right side 120D, and/or the left side 120E of the front rigid body 105 in the example of FIG. 1. The imaging device may be configured to determine a position (includes orientation) of the HMD 100 based upon the detected locations of the locators 135, which may be used to determine the content to be displayed to the user. For example, where the HMD 100 is part of a HMD system, the position of the HMD 100 may be used to determine which virtual objects positioned in different locations are visible to the user of the HMD 100.

Figure 2:
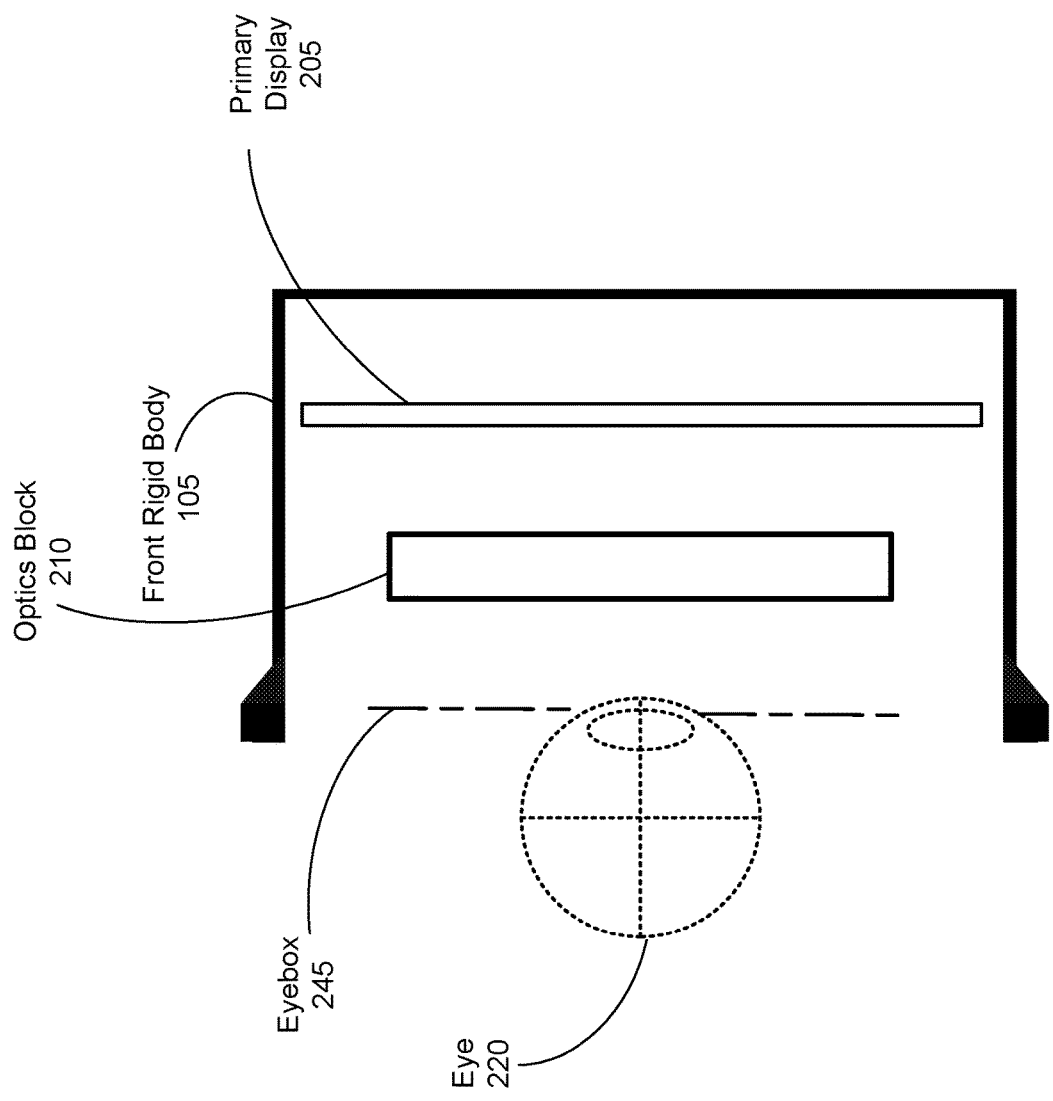
FIG. 2 is a cross section of a front rigid body of the HMD shown in FIG. 1, in accordance with one or more embodiments.

FIG. 2 is a cross section 200 of the front rigid body 105 of the HMD 100 shown in FIG. 1, in accordance with one or more embodiments. As shown in FIG. 2, the front rigid body 105 includes primary display 205 and an optics block 210. For purposes of illustration, FIG. 2 shows a cross section of the front rigid body 105 in accordance with a single eye 220. Another primary display 205 and optics block 210, separate from those shown in FIG. 2, may be included in the front rigid body 105 to present content to another eye of the user.

The primary display 205 displays images and/or video to the user as generated by the HMD 100 or another device. In particular, the primary display 205 emits image light toward the optics block 210. In some embodiments, the primary display 205 includes one or more linear polarizers that linearly polarize light emitted from the primary display. Alternatively, light emitted from light emitting components is emitted as linearly polarized light. Examples of the primary display 205 include: a liquid crystal display (LCD), an organic light emitting diode (OLED) display, an active-matrix organic light-emitting diode display (AMOLED), a transparent organic light-emitting diode display (TOLED), some other display, or some combination thereof. In some embodiments, the front rigid body 105 includes a temporal display (not shown in FIG. 2) in addition to the primary display 205. The temporal display displays images and/or video to the user. Operation of the temporal display is described below with reference to FIG. 3.

The optics block 210 magnifies received image light from the electronic display element 205, corrects optical errors associated with the image light, and presents the corrected image light to a user of the HMD 100. The optics block 210 directs the magnified and/or corrected image light to an eyebox 245 for presentation to a user wearing the HMD 100. The eyebox 245 is a location in space that would be occupied by an eye 220 of a user of the HMD 100.

In an embodiment, the optics block 210 includes one or more optical elements and/or combinations of different optical elements. For example, an optical element is an aperture, a Fresnel lens, a convex lens, a concave lens, a filter, or any other suitable optical element that affects the image light emitted from the primary display 205. In some embodiments, the optics block 210 includes a peripheral lens assembly coupled to a periphery of the optics block 210. In some embodiments, one or more of the optical elements in the optics block 210 may have one or more coatings, such as anti-reflective coatings.

Magnification of the image light by the optics block 210 allows the primary display 205 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. Additionally, in some embodiments, the amount of magnification is adjusted by adding or removing optical elements.

In some embodiments, the optics block 210 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the primary display 205 for display is pre-distorted, and the optics block 210 corrects the distortion when it receives image light from the primary display 205 generated based on the content.

Figure 3:
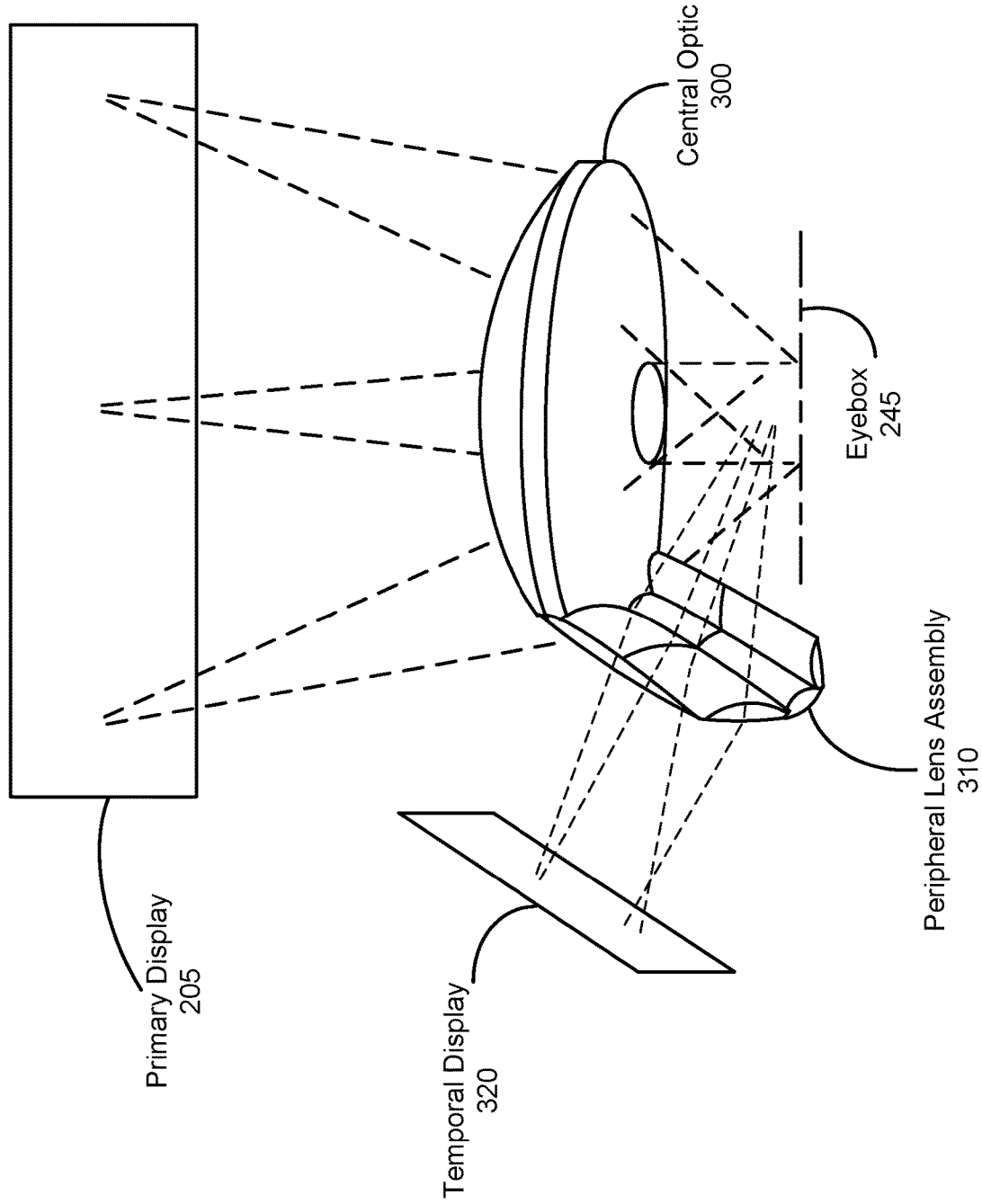
FIG. 3 is a perspective view of a TOA and an electronic display assembly, in accordance with one or more embodiments.

FIG. 3 is a perspective view of a TOA and an electronic display assembly, in accordance with one or more embodiments.

The electronic display assembly includes a primary display 205 and a temporal display 320. In some embodiments, the temporal display 320 is facing in a direction of the temple of a user. The primary display 205 includes a first portion of the electronic display assembly and the temporal display 320 includes a second portion of the electronic display assembly. The temporal display 320 may have a lower resolution than that of the primary display 205. In some embodiments, the primary display 205 and the temporal display 320 are located in the same plane, and in some instances may be different portions of a single display. A reflective element may be coupled to a portion of the peripheral lens assembly 310 and provide light from the temporal display 320 to the peripheral lens assembly 310 (not shown in FIG. 3). The temporal display 320 is separated from the primary display 205 by a first distance. This embodiment is further described below with reference to FIG. 5.

The TOA provides light from the electronic display assembly to the eyebox 245. The TOA includes a central optic 300 and a peripheral lens assembly 310. The central optic 300 transmits light over a first angular range from a first portion of the electronic display assembly to the eyebox 245. The first angular range may extend from +/−40° horizontally to +/−550 horizontally, depending on the application. In some embodiments, the central optic 300 includes a Pancake lens assembly, a Fresnel lens, a positive lens, a negative lens, an aperture, or some combination thereof. The central optic 300 is transparent in the visible band. In some embodiments, the central optic 300 is also transparent in an infrared band (~800 nm to 1700 nm).

The peripheral lens assembly 310 transmits light over a second angular range from a second portion of the electronic display assembly, wherein the second angular range is different than the first angular range. The second angular range partially overlaps with the temporal edge of the edge of the first angular range, and serves to provide additional field of view in the temporal direction. The second angular range may extend up to or beyond the human peripheral limits (100° from forward gaze). For example, the first angular range may extend from 45° nasally to 450 temporally and the second angular range may extend from 40° temporally to 950 temporally. Some angular overlap is required to allow eye motion. The magnitude of overlap is driven by the expected eye motion and distance from eye to lens boundary. In some embodiments, the peripheral lens array 310 transmits light from a temporal display 320 to the eyebox 245. The first angular range and the second angular range together form a field of view of a head mounted display. The peripheral lens assembly 310 is coupled along a periphery of the central optic 300. In one embodiment, the peripheral lens assembly 310 is a single lens (e.g. monolithic). In alternate embodiments, the peripheral lens assembly 310 includes a plurality of lenses (e.g. composite lens). The number of lenses in the peripheral lens assembly 310 may change. This embodiment is further described below with reference to FIG. 4.

Figure 4:
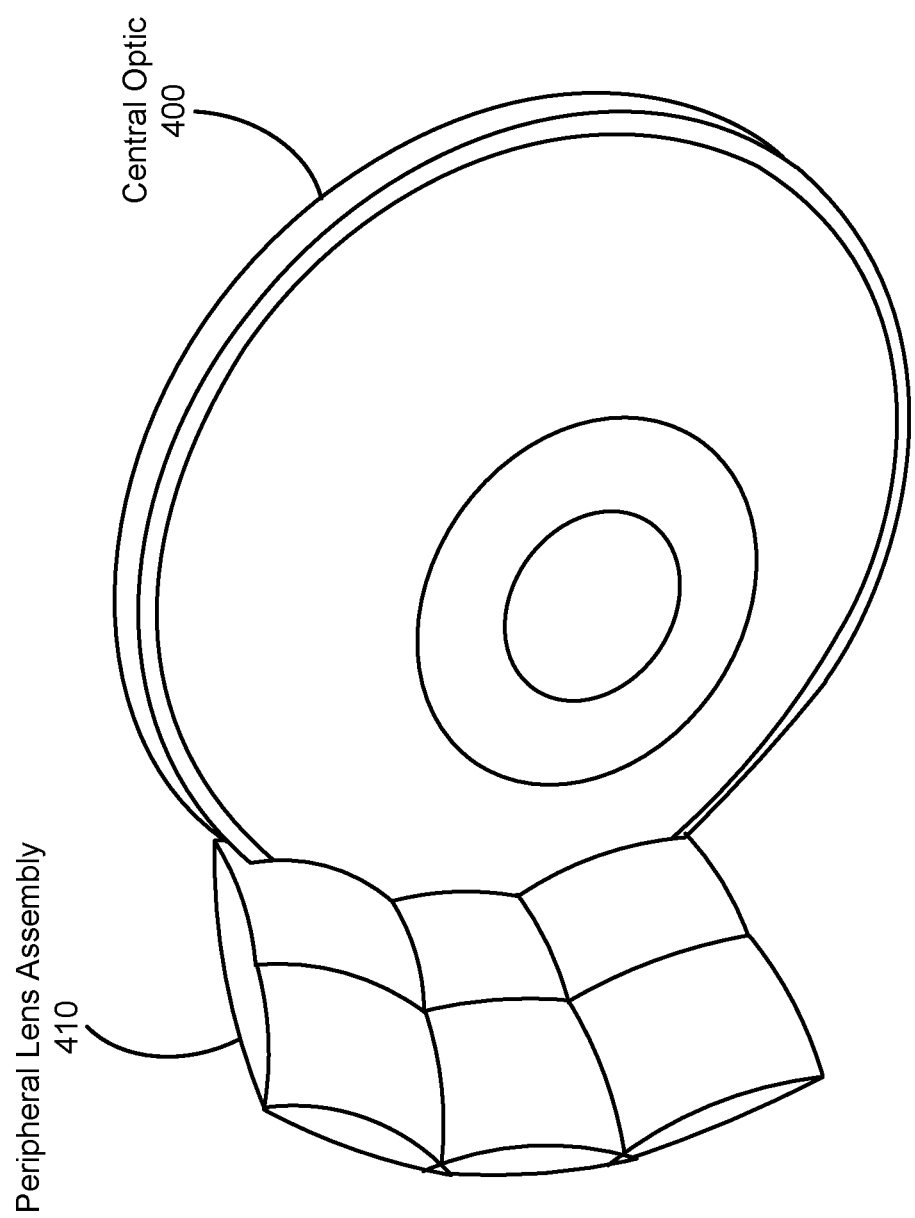
FIG. 4 is a diagram of the TOA of FIG. 3, in accordance with one or more embodiments.

FIG. 4 is a diagram of a TOA, in accordance with one or more embodiments. The TOA includes a central optic 400 and a peripheral lens assembly 410.

In this embodiment, the central optic 400 is in a pancake lens assembly configuration. The pancake lens assembly configuration, in one embodiment, includes a front optical element and a back optical element. One or more surfaces of the front optical element and the back optical element are shaped to correct for field curvature. One or more surfaces of the front optical element may be shaped to be spherically concave (e.g., a portion of a sphere), spherically convex, plane, a rotationally symmetric sphere, a freeform shape, or some other shape that mitigates field curvature. In some embodiments, the shape of one or more surfaces of the front optical element and back optical element are designed to additionally correct for other forms of optical aberration. In some embodiments, one or more of the optical elements within the pancake lens block may have one or more coatings, such as anti-reflective coatings, to reduce ghost images and enhance contrast. The pancake lens block is further described in U.S. Patent Application No. 62/302,675, filed on Mar. 2, 2016, U.S. patent application Ser. No. 15/179,935, filed on Jun. 10, 2016, and Patent Application No. 62/350,644, filed on Jun. 15, 2016, each of which is hereby incorporated by reference in its entirety.

In the embodiment of FIG. 4, the peripheral lens assembly 310 is a composite lens that includes a plurality of lenses. For example, the peripheral lens assembly 310 may be a 3×2 matrix (3 rows by 2 columns) as shown in FIG. 4. The peripheral lens assembly 310 may include convex lens, concave lens, or some combination thereof. The peripheral lens assembly 310 is coupled along a periphery of the central optic 300 and transmits light from the temporal display 320, as described above in conjunction with FIG. 3. More specifically, the peripheral lens assembly 310 is coupled along an arc of the central optic, which is mostly circular in shape, as shown in FIG. 4. The length of the arc directly corresponds to dimensions of each of the plurality of lenses. The dimensions may include thickness, curvature, length, and height. In some embodiments, the plurality of lenses have substantially similar dimensions. In alternate embodiments, the plurality of lenses have different dimensions. In this embodiment, the angular fields of view of each lens element overlaps with the fields serviced by adjacent lenses. In solid angle, the minimum field of view serviced by each lens element (without the additional overlap) is $\Omega_{FOV} \approx$ [Lens Area]/[Distance from lens to eye pupil]. This solid angle (units Steradians) is the minimum field serviced by each lens if there is no overlap. Additional field overlap is required to accommodate finite human pupil size and eye motion. In the case where the lenses are small relative to the eye-to-lens distance, the field overlap of adjacent lens elements approaches 100%. More lenses with shorter focal results in a reduction of angular resolution. Therefore, there exists a tradeoff between compactness of the peripheral assembly and resolution.

Figure 5:
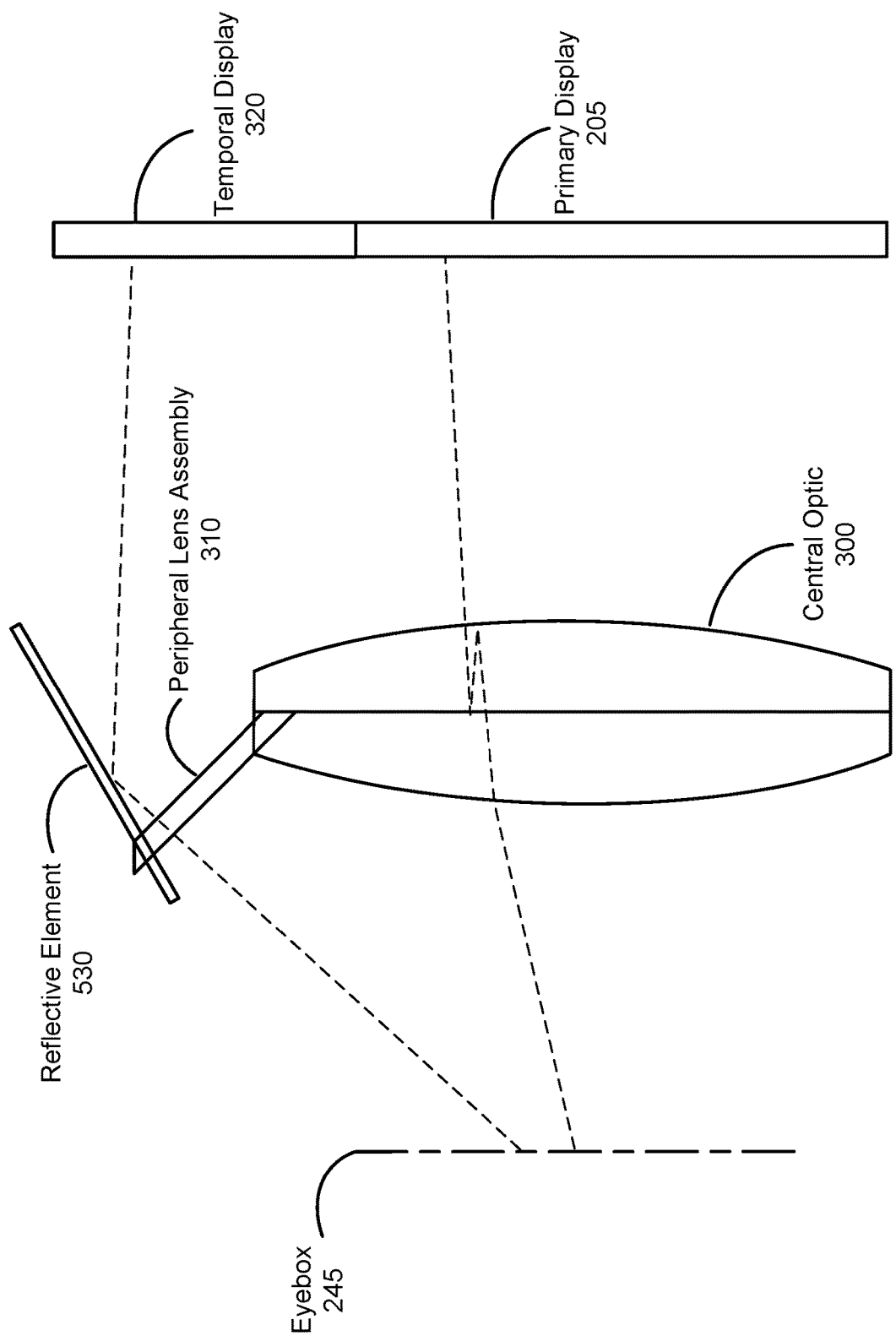
FIG. 5 is an aerial view of the TOA and electronic display assembly of FIG. 3, in accordance with one or more embodiments.

FIG. 5 is a cross section of the TOA and electronic display assembly of FIG. 3, in accordance with one or more embodiments. The primary display 205 emits linearly polarized light (e.g., includes a linear polarizer that polarizes light). In the embodiment of FIG. 5, the primary display 205 and the temporal display 320 are in a same plane. The TOA transmits the light from the primary display 205 to the eyebox 245. The TOA includes a reflective element 530 that is coupled to a portion of the peripheral lens assembly 310. The reflective element 530 provides light from the temporal display 320 to the peripheral lens assembly 310. In some embodiments, the reflective element 530 is a fold mirror. Light from the peripheral lens assembly 310 is provided to a portion of the eyebox 245 corresponding to a portion of a user's peripheral FOV. Light from the central optic 300 is provided to a portion of the eyebox 245 corresponding to the center of a user's FOV. In some embodiments, light provided to the pupil in a rotated position 510 is a lower resolution than light provided to the pupil in a centered position 520.

Figure 6:
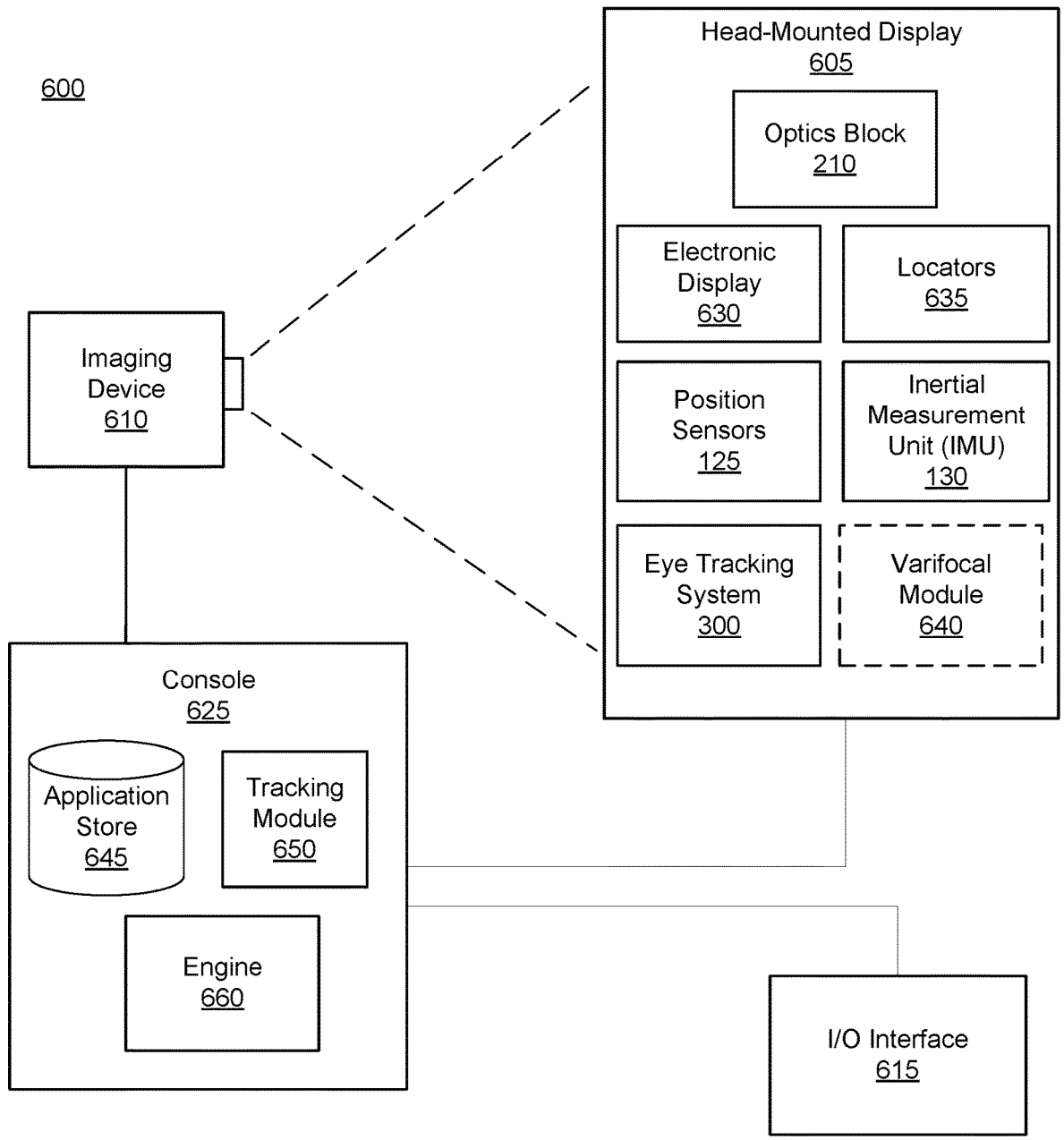
FIG. 6 is a block diagram of a HMD system, in accordance with one or more embodiments.

FIG. 6 is a HMD system 600 in accordance with one or more embodiments. The system 600 may be for use as an artificial reality system. In this example, the system 600 includes a HMD 605, an imaging device 610, and an input/output (I/O) interface 615, which are each coupled to a console 625. While FIG. 6 shows a single HMD 605, a single imaging device 610, and a single I/O interface 615, in other embodiments, any number of these components may be included in the system. For example, there may be multiple HMDs 600 each having an associated I/O interface 615 and being monitored by one or more imaging devices 610, with each HMD 605, I/O interface 615, and imaging devices 610 communicating with the console 625. In alternative configurations, different and/or additional components may also be included in the system 600.

The HMD 605 may act as an artificial reality HMD. In some embodiments, the HMD 605 augments views of a physical, real-world environment with computer-generated elements (e.g., images, video, sound, etc.). The HMD 605 presents content to a user. In some embodiments, the HMD 100 is an embodiment of the HMD 605. Example content includes images, video, audio, or some combination thereof. Audio content may be presented via a separate device (e.g., speakers and/or headphones) external to the HMD 605 that receives audio information from the HMD 605, the console 625, or both. The HMD 605 includes an electronic display 630, an optics block 210, one or more locators 635, the position sensors 125, and the internal measurement unit (IMU) 130.

The electronic display 630 displays 2D or 3D images to the user in accordance with data received from the console 625. In various embodiments, the electronic display 630 comprises a single electronic display element (e.g., the electronic display element 205) or multiple electronic displays (e.g., a display for each eye of a user). The multiple electronic displays may include a primary display and a temporal display. Examples of the electronic display element include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, some other display, or some combination thereof.

The optics block 210 magnifies image light received from the electronic display 630, corrects optical errors associated with the image light, and presents the corrected image light to a user of the HMD 605. The optics block 210 includes a plurality of optical elements. Example optical elements included in the optics block 210 include: an aperture, a Fresnel lens, a convex lens, a concave lens, a filter, a reflecting surface, a feature waveguide, or any other suitable optical element that affects image light. Moreover, the optics block 210 may include combinations of different optical elements. In some embodiments, the optics block 210 includes a peripheral lens assembly coupled to a periphery of the optics block 210. In some embodiments, one or more of the optical elements in the optics block 210 may have one or more coatings, such as partially reflective or anti-reflective coatings.

The locators 635 are objects located in specific positions on the HMD 605 relative to one another and relative to a specific reference point on the HMD 605. The locators 135 are an embodiment of the locators 635. A locator 635 may be a light emitting diode (LED), a corner cube reflector, a reflective marker, a type of light source that contrasts with an environment in which the HMD 605 operates, or some combination thereof. Active locators 635 (i.e., an LED or other type of light emitting device) may emit light in the visible band (~380 nm to 750 nm), in the infrared (IR) band (~440 nm to 1700 nm), in the ultraviolet band (10 nm to 380 nm), some other portion of the electromagnetic spectrum, or some combination thereof.

The locators 635 can be located beneath an outer surface of the HMD 605, which is transparent to the wavelengths of light emitted or reflected by the locators 635 or is thin enough not to substantially attenuate the wavelengths of light emitted or reflected by the locators 635. Further, the outer surface or other portions of the HMD 605 can be opaque in the visible band of wavelengths of light. Thus, the locators 635 may emit light in the IR band while under an outer surface of the HMD 605 that is transparent in the IR band but opaque in the visible band.

The IMU 130 is an electronic device that generates IMU data based on measurement signals received from one or more of the position sensors 125, which generate one or more measurement signals in response to motion of HMD 605. Examples of the position sensors 125 include accelerometers, gyroscopes, magnetometers, other sensors suitable for detecting motion, correcting error associated with the IMU 130, or some combination thereof.

Based on the measurement signals from the position sensors 125, the IMU 130 generates IMU data indicating an estimated position of the HMD 605 relative to an initial position of the HMD 605. For example, the position sensors 125 include multiple accelerometers to measure translational motion (forward/back, up/down, left/right) and multiple gyroscopes to measure rotational motion (e.g., pitch, yaw, and roll). The IMU 130 can, for example, rapidly sample the measurement signals and calculate the estimated position of the HMD 605 from the sampled data. For example, the IMU 130 integrates measurement signals received from the accelerometers over time to estimate a velocity vector and integrates the velocity vector over time to determine an estimated position of a reference point on the HMD 605. The reference point is a point that may be used to describe the position of the HMD 605. While the reference point may generally be defined as a point in space, in various embodiments, a reference point is defined as a point within the HMD 605 (e.g., a center of the IMU 130). Alternatively, the IMU 130 provides the sampled measurement signals to the console 625, which determines the IMU data.

The imaging device 610 generates image data in accordance with calibration parameters received from the console 625. Image data includes one or more images showing observed positions of the locators 635 that are detectable by imaging device 610. The imaging device 610 may include one or more cameras, one or more video cameras, other devices capable of capturing images including one or more locators 635, or some combination thereof. Additionally, the imaging device 610 may include one or more filters (e.g., for increasing signal to noise ratio). The imaging device 610 is configured to detect light emitted or reflected from the locators 635 in a field of view of the imaging device 610. In embodiments where the locators 635 include passive elements (e.g., a retroreflector), the imaging device 610 may include a light source that illuminates some or all of the locators 635, which retro-reflect the light towards the light source in the imaging device 610. Image data is communicated from the imaging device 610 to the console 625, and the imaging device 610 receives one or more calibration parameters from the console 625 to adjust one or more imaging parameters (e.g., focal length, focus, frame rate, ISO, sensor temperature, shutter speed, aperture, etc.).

The I/O interface 615 is a device that allows a user to send action requests to the console 625. An action request is a request to perform a particular action. For example, an action request may be to start or end an application or to perform a particular action within the application. The I/O interface 615 may include one or more input devices. Example input devices include a keyboard, a mouse, a game controller, or any other suitable device for receiving action requests and communicating the received action requests to the console 625. An action request received by the I/O interface 615 is communicated to the console 625, which performs an action corresponding to the action request. In some embodiments, the I/O interface 615 may provide haptic feedback to the user in accordance with instructions received from the console 625. For example, haptic feedback is provided by the I/O interface 615 when an action request is received, or the console 625 communicates instructions to the I/O interface 615 causing the I/O interface 615 to generate haptic feedback when the console 625 performs an action.

The console 625 provides content to the HMD 605 for presentation to the user in accordance with information received from the imaging device 610, the HMD 605, or the I/O interface 615. In the example shown in FIG. 6, the console 625 includes an application store 645, a tracking module 650, and an engine 660. Some embodiments of the console 625 have different or additional modules than those described in conjunction with FIG. 6. Similarly, the functions further described below may be distributed among components of the console 625 in a different manner than is described here.

The application store 645 stores one or more applications for execution by the console 625. An application is a group of instructions, that when executed by a processor, generates content for presentation to the user. Content generated by an application may be in response to inputs received from the user via movement of the HMD 605 or the I/O interface 615. Examples of applications include gaming applications, conferencing applications, video playback application, or other suitable applications.

The tracking module 650 calibrates the system 600 using one or more calibration parameters and may adjust one or more calibration parameters to reduce error in determining position of the HMD 605. For example, the tracking module 650 adjusts the focus of the imaging device 610 to obtain a more accurate position for observed locators 635 on the HMD 605. Moreover, calibration performed by the tracking module 650 also accounts for information received from the IMU 215. Additionally, if tracking of the HMD 605 is lost (e.g., imaging device 610 loses line of sight of at least a threshold number of locators 635), the tracking module 650 re-calibrates some or all of the system 600 components.

Additionally, the tracking module 650 tracks the movement of the HMD 605 using image information from the imaging device 610 and determines positions of a reference point on the HMD 605 using observed locators from the image information and a model of the HMD 605. The tracking module 650 also determines positions of the reference point on the HMD 605 using position information from the IMU information from the IMU 215 on the HMD 605. Additionally, the tracking module 650 may use portions of the IMU information, the image information, or some combination thereof, to predict a future location of the HMD 605, which is provided to the engine 660.

The engine 660 executes applications within the system 600 and receives position information, acceleration information, velocity information, predicted future positions, or some combination thereof for the HMD 605 from the tracking module 650. Based on the received information, the engine 660 determines content to provide to the HMD 605 for presentation to the user, such as a virtual scene, one or more virtual objects to overlay onto a real world scene, etc. Additionally, the engine 660 performs an action within an application executing on the console 625 in response to an action request received from the I/O interface 615 and provides feedback to the user that the action was performed. The provided feedback may be visual or audible feedback via the HMD 605 or haptic feedback via VR I/O interface 615.

In some embodiments, the engine 660 estimates one or more future positions of the HMD 605 using the IMU data from the HMD 605. The engine 660 generates warping parameters based on the one or more estimated future positions, and provides 660 the warping parameters to the HMD 605 with the content.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A tiled optical assembly (TOA) comprising:
   a central optic configured to transmit light over a first angular range from a first portion of an electronic display assembly to an eyebox; and
   a peripheral lens assembly comprising an array of a plurality of lenses coupled along an arc of a periphery of the central optic, each lens of the plurality of lenses being coupled along the arc at an angle relative to other adjacent lenses in the array coupled along the arc, the peripheral lens assembly configured to transmit light over a second angular range from a second portion of the electronic display assembly, wherein the second angular range is different than the first angular range, and the first angular range and the second angular range together form a field of view of a head mounted display.

2. The TOA of claim 1, wherein the central optic is a Pancake lens assembly.

3. The TOA of claim 1, wherein the first portion of the electronic display assembly is a primary display and the second portion of the electronic display assembly is a temporal display.

4. The TOA of claim 3, wherein the temporal display has a lower resolution than the primary display.

5. The TOA of claim 3, wherein the primary display and the temporal display are in a same plane, and the TOA further comprises:
   a reflective element that is coupled to a portion of the peripheral lens assembly, the reflective element configured to provide light from the temporal display to the peripheral lens assembly.

6. The TOA of claim 3, wherein the temporal display is separated from the primary display by a first distance.

7. The TOA of claim 1, wherein the first portion of the electronic display assembly and the second portion of the electronic display assembly are located a same plane, and the TOA further comprises:
   a reflective element is coupled to a portion of the peripheral lens assembly, the reflective element configured to provide light from the second portion of the electronic display assembly to the peripheral lens assembly.

8. The TOA of claim 1, wherein the first angular range is greater than the second angular range.

9. The HMD of claim 1, wherein the array of the plurality of lenses are arranged in a matrix comprising of at least two rows of lenses and at least two columns of lenses.

10. The HMD of claim 1, wherein each lens of the plurality of lenses being coupled along the arc at the angle relative to other adjacent lenses in the array coupled along the arc includes each lens of the plurality of lenses being coupled along the arc of the central optic having an optical axis that is at an angle relative to the optical axis of an adjacent lens coupled along the arc.

11. A head-mounted display (HMD) comprising:
   an electronic display assembly configured to emit image light;
   a central optic configured to transmit light over a first angular range from a first portion of the electronic display assembly to an eyebox; and
   a peripheral lens assembly comprising an array of a plurality of lenses coupled along an arc of a periphery of the central optic, each lens of the plurality of lenses being coupled along the arc at an angle relative to other adjacent lenses in the array coupled along the arc, the peripheral lens assembly configured to transmit light over a second angular range from a second portion of the electronic display assembly, wherein the second angular range is different than the first angular range, and the first angular range and the second angular range together form a field of view of a head mounted display.

12. The HMD of claim 11, wherein the central optic is a Pancake lens assembly.

13. The HMD of claim 11, wherein the first portion of the electronic display assembly is a primary display and the second portion of the electronic display assembly is a temporal display.

14. The HMD of claim 13, wherein the temporal display has a lower resolution than the primary display.

15. The HMD of claim 13, wherein the primary display and the temporal display are in a same plane, and the HMD further comprises:
   a reflective element that is coupled to a portion of the peripheral lens assembly, the reflective element configured to provide light from the temporal display to the peripheral lens assembly.

16. The HMD of claim 13, wherein the temporal display is separated from the primary display by a first distance.

17. The HMD of claim 11, wherein the first portion of the electronic display assembly and the second portion of the electronic display assembly are in a same plane, and the HMD further comprises:
   a reflective element is coupled to a portion of the peripheral lens assembly, the reflective element configured to provide light from the second portion of the electronic display assembly to the peripheral lens assembly.

18. The HMD of claim 11, wherein the first angular range is greater than the second angular range.

19. The HMD of claim 11, wherein the array of the plurality of lenses are arranged in a matrix comprising of at least two rows of lenses and at least two columns of lenses.

20. The HMD of claim 11, wherein each lens of the plurality of lenses being coupled along the arc at the angle relative to other adjacent lenses in the array coupled along the arc includes each lens of the plurality of lenses being coupled along the arc of the central optic having an optical axis that is at an angle relative to the optical axis of an adjacent lens coupled along the arc.

* * * * *